(12) United States Patent
Saupe et al.

(10) Patent No.: US 6,921,565 B2
(45) Date of Patent: Jul. 26, 2005

(54) HOSE CONSTRUCTION CONTAINING THERMOPLASTIC QUADPOLYMERS

(75) Inventors: Timothy Paul Saupe, Lincoln, NE (US); Carol Lynn Ainsworth, Sun Prairie, WI (US)

(73) Assignee: The Goodyear Tire & Rubber Company, Akron, OH (US)

( * ) Notice: Subject to any disclaimer, the term of this patent is extended or adjusted under 35 U.S.C. 154(b) by 2 days.

(21) Appl. No.: 10/630,326

(22) Filed: Jul. 30, 2003

(65) Prior Publication Data

US 2005/0025923 A1 Feb. 3, 2005

(51) Int. Cl.⁷ .............................. B29D 22/00; F16L 9/14
(52) U.S. Cl. .................. 428/36.91; 428/35.9; 428/36.2; 428/36.7; 428/215; 138/137; 138/141; 138/DIG. 1; 138/DIG. 3
(58) Field of Search ............................... 428/35.9, 36.2, 428/36.7, 36.9, 36.91, 215; 138/137, 141, 161, 163

(56) References Cited

U.S. PATENT DOCUMENTS

| | | | | |
|---|---|---|---|---|
| 4,606,952 A | * | 8/1986 | Sugimoto et al. | 428/36.8 |
| 5,320,888 A | | 6/1994 | Stevens | 428/36.2 |
| 5,430,603 A | * | 7/1995 | Albino et al. | 361/215 |
| 5,639,528 A | | 6/1997 | Feit et al. | 428/36.91 |
| 5,679,425 A | | 10/1997 | Plumley | 428/36.91 |
| 5,941,286 A | | 8/1999 | Fauble et al. | 138/137 |
| 6,261,657 B1 | | 7/2001 | Ainsworth et al. | 428/36.91 |
| 6,489,420 B1 | | 12/2002 | Duchesne et al. | 526/255 |
| 2003/0113464 A1 | | 6/2003 | Fukushi et al. | 427/407.1 |

FOREIGN PATENT DOCUMENTS

| | | | | |
|---|---|---|---|---|
| WO | PCT/US94/06347 | 5/1995 | | B32B/25/08 |
| WO | PCT/US00/29168 | 1/2002 | | |
| WO | WO 02/16111 A1 | 2/2002 | | B29C/47/06 |
| WO | WO 02/16131 A1 | 2/2002 | | B32B/27/08 |

OTHER PUBLICATIONS

Technical Information, Dyneon, Dyncon™ Fluorothermoplastic THV X 815 G.
Technical Information, Dyneon, Dyneon™ Fluorothermoplastics THV 500A.
Technical Information, Dyneon, Dyneon™ Fluorothermoplastics Product Information.
Technical Information, Dyneon, Dyneon™ Fluoroelastomers Compounding Fluroelastomers.
European Search Report.
Derwent Publication Data Sheet from JP56070009, published Jun. 11, 1986.

* cited by examiner

Primary Examiner—Donald J. Loney
(74) Attorney, Agent, or Firm—John D. DeLong

(57) ABSTRACT

The present invention relates to a hose construction containing a thermoplastic barrier and a fluoroelastomer rubber layer. The hose comprises (1) a rubber layer comprising FKM rubber; and (2) a barrier layer comprised of a thermoplastic quadpolymer derived from (i) tetrafluoroethylene, (ii) vinylidene fluoride, (iii) at least one ethylenically unsaturated monomer of the formula $CF_2=CFR_f$ where $R_f$ is a perfluoroalkyl or a perfluoroalkoxy of 1 to 8 carbon atoms, and (iv) a perfluorovinyl ether of the formula $CF_2=CF-(OCF_2\ CF(R_f))_aOR'_f$ where $R_f$ is as described in (iii), $R'_f$ is a perfluoroaliphatic, preferably a perfluoroalkyl or a perfluoroalkoxy, of 1 to 8, preferably 1 to 3, carbon atoms, and a has a value of 0 to 3; wherein the barrier layer is adhered to the rubber layer with an adhesive amount of a thermoplastic terpolymer derived from tetrafluoroethylene, hexafluoropropylene and vinylidene fluoride.

20 Claims, 1 Drawing Sheet

HOSE CONSTRUCTION CONTAINING THERMOPLASTIC QUADPOLYMERS

BACKGROUND OF THE INVENTION

A major proportion of fuel hose presently employed in automobile applications is a multi-layered structure. The innermost tubular layer of the hose is formed of an elastomeric material intended to keep the fluid in the hose. Located between the innermost layer and the outer elastomeric cover is a barrier layer. In other fuel hoses, the barrier layer is the innermost tubular layer (known as a veneer hose), with the elastomeric material being located outside of such barrier layer. Many barrier layers have been used; however, many such compounds used in the barrier do not adhere to the conventional elastomeric material used in the innermost tubular layer. As a result of this problem, those skilled in the art conventionally use a layer between the innermost layer and the barrier layer which is both compatible to the elastomer used in the innermost layer and the barrier layer. In particular, the adhesion between highly impermeable thermoplastic polymer barrier layers and elastomeric innermost layers has been problematic. It is desirable, therefore, to have a hose having excellent adhesion between a highly impermeable thermoplastic polymer barrier layer and an elastomeric inner.

SUMMARY OF THE INVENTION

There is disclosed a hose comprising:
(1) a rubber layer comprising an FKM fluoroelastomer; and
(2) a barrier layer comprised of a thermoplastic quadpolymer derived from (i) tetrafluoroethylene, (ii) vinylidene fluoride, (iii) at least one ethylenically unsaturated monomer of the formula $CF_2=CFR_f$, where $R_f$ is a perfluoroalkyl or a perfluoroalkoxy of 1 to 8 carbon atoms, and (iv) a perfluorovinyl ether of the formula $CF_2=CF-(OCF_2\ CF(R_f))_aOR'_f$, where $R_f$ is as described in (iii), $R'_f$ is a perfluoroaliphatic, preferably a perfluoroalkyl or a perfluoroalkoxy, of 1 to 8, preferably 1 to 3, carbon atoms, and a has a value of 0 to 3;
wherein the barrier layer is adhered to the rubber layer with an adhesive amount of a thermoplastic terpolymer of tetrafluoroethylene, hexafluoropropylene and vinylidene fluoride.

DETAILED DESCRIPTION OF THE INVENTION

Figure 1:
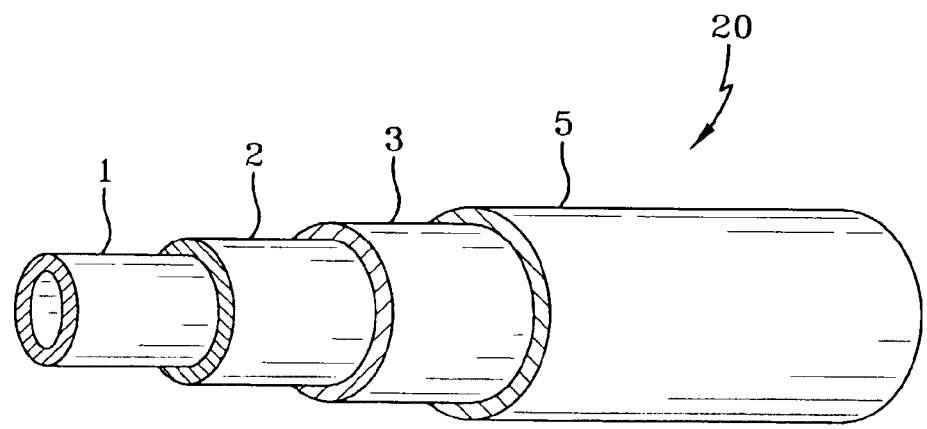
FIG. 1 is a perspective view of a hose according to the invention.

When a hose (20), for example, as shown in FIG. 1 is produced, the inner core (1) or tubular core of the present invention may be formed FKM rubber, with barrier layer (3) adhered thereto via adhesive layer (2). An embodiment where the inner core (1) is a barrier layer and the layer (3) is of the FKM composition that is adhered thereto via adhesive layer (2) will be described later.

The FKM fluoroelastomers which can be used according to the invention have been available for some time. For example, the FLUOREL brand of fluoroelastomers, introduced by the 3M Company of Minnesota in the early 1960's, are suitable for use in this invention. These fluoroelastomers are tetrafluoroethylene (TFE)/hexafluoropropylene(HFP)/vinylidene fluoride($VF_2$) terpolymer compositions, which are melt processable, providing a useful combination of performance and processing advantages without the need for organic additives. They are characterized by low processing temperature range (100° C. to 175° C.), co-processability with temperature-sensitive substrates, like non-fluorinated plastics, and elastomers, like ECO. They also are essentially amorphous and have the characteristics of elastomers, i.e., they are thermosetting compounds which exhibit a 100% stretch without deformation. Typically, the fluoroelastomers contain about 65–71% fluorine by weight. They also show excellent flexibility/elongation features with low flexural modulus, good flex fatigue life, and avoidance of stress cracking. They evince versatile bondability (hot melt adhesive) and a broad temperature service range.

These fluoroelastomers can have a relatively wide range of monomer ratios. These fluoroelastomers are generally described in U.S. Pat. No. 2,833,752, issued May 5, 1958 and U.S. Pat. No. 5,208,305, issued May 4, 1993, both of which patents are incorporated herein by reference. Generally, the TFE component can be present in the range of 0 to 70 parts by weight, the HFP component can have a range of 20 to 50 parts by weight and the $VF_2$ component can have a range of 20 to 80, based on 100 parts by weight of FKM. The preferred fluoroelastomer is a fluoroelastomer sold by 3M Company under the designation FE5830Q This polymer has about 33% $VF_2$, 24% TFE and 43% HFP, by weight.

Suitable FKM polymers are obtained, for example, by polymerizing a mixture of monomers consisting of 40 mol percent of TFE, 30 mol percent of HFP and 30 mol percent of $VF_2$, with the monomer mixture also containing up to 5 parts by weight of a bisphenol cross-linking agent per 100 parts by weight, of the three monomers and 1–20 parts of a basic metal oxide. This FKM composition is suited to a well-known extrusion process for forming the FKM layer.

The FKM polymer is compounded with various additives as are known in the art, such as acid acceptors, fillers, processing aids, and curatives. General reference for the compounding of FKM may be made to the technical publication "Compounding Fluoroelastomers", available from Dyneon.

Acid acceptors useful in the FKM composition include one or more of calcium hydroxide, magnesium hydroxide, litharge, PbHPO3, calcium oxide, and zinc oxide, and the like. Acid acceptors may be used in a concentration of about 6 to 20 phr.

Fillers useful in the FKM composition include one or more of carbon black, silica, various iron and zinc oxides, zinc sulfide, calcium carbonate, barium sulfate, and calcium metasilicate. Fillers may be used in a concentration of up to 80 phr.

Processing aids useful in the FKM composition include one or more waxes, plasticizers, or lubricants, including dibutyl sebacate, dioctyl pthalate, carnauba wax, and polyethylene. Processing aids may be used in a concentration of up to about 3 phr.

Curatives may include various cure systems for FKM as are known in the art, including peroxide/coagent, diamine, and dihydroxy type curatives. Examples of diamine curatives include Diak No. 3, dicinnamylidene hexane diamine, and Diak No. 1, hexamethylene diamine carbamate. One example of a peroxide/coagent system is 2,5-dimethyl-2,5

Di(t-butyl peroxy)hexane as the peroxide and triallylisocyanurate as the coagent. One example of a dihydroxy type curative is hexafluoropropylidene diphenol accelerated with triphenylbenzylphosphonium chloride. Curatives may be used in a concentration of about 1 to 4 phr.

The mixing of the FKM rubber composition can be accomplished by methods known to those having skill in the rubber mixing art. For example, the ingredients may be mixed in one stage but are typically mixed in at least two stages, namely at least one non-productive stage followed by a productive mix stage. The final curatives, including curatives, are typically mixed in the final stage which is conventionally called the "productive" mix stage in which the mixing typically occurs at a temperature, or ultimate temperature, lower than the mix temperature(s) than the preceding non-productive mix stage(s).

Curing of the FKM rubber composition is generally carried out at conventional temperatures ranging from about 160° C. to 190° C. Preferably, the curing is conducted at temperatures ranging from about 170° C. to 180° C. Curing may be done using any of the methods as are known in the art, such as with a steam autoclave, heated press, or the like.

Referring to FIG. 1, the inner core (1) may be of the above-described FKM with the barrier layer (3) adhered thereto via adhesive layer (2).

In accordance with another embodiment, the barrier layer (I) may be the inner core with a FKM rubber layer (3) adhered thereto via adhesive layer (2).

The FKM layer may be formed by extrusion methods known to those skilled in the art. The thickness of this layer, whether the inner core (1) or layer (3), is important as excessively thin wall thicknesses or excessively thick wall thicknesses present flexibility or kinking problems or coupling compatibility problems of the final hose composite. It is believed that the inside diameter of the inner core (1), whether made from the FKM or barrier layer, should range from 3 mm to 100 mm. Preferably, the inside diameter of the inner core will range from 4 mm to 75 mm. When the inner core is made from the FKM, the wall thicknesses of the inner core (1) should range from 0.1 mm to 8.0 mm, with a range of from 0.5 mm to 4.0 mm being preferred. When the inner core is made from the barrier layer compound, the wall thicknesses of the inner core (1) should range from 0.02 to 0.76 mm.

One advantage of the present invention is that the layer of FKM may be adhered to the barrier layer used in the present invention via adhesive layer (2). Accordingly, the superior permeation resistance of the barrier layer (3) may be utilized without sacrifice of adhesion between the FKM layer and the barrier layer.

The barrier layer (1) or (3) used in the present invention is derived from a thermoplastic quadpolymer as will be described more fully later herein. The thickness of this barrier layer (3) is important, as excessively thin wall thicknesses or excessively thick wall thicknesses present flexibility or kinking problems or desired barrier properties. Generally speaking, the thickness of the barrier layer (3) will range from about 0.1 mm to about 1 mm. Alternatively, the thickness of the barrier layer (3) will range from about 0.15 mm to 0.5 mm.

Suitable thermoplastic quadpolymers are disclosed in U.S. Pat. No. 6,489,420, fully incorporated herein by reference. As disclosed therein, suitable thermoplastic quadpolymers are derived from (i) tetrafluoroethylene, (ii) vinylidene fluoride, (iii) at least one ethylenically unsaturated monomer of the formula $CF_2=CFR_f$ where $R_f$ is a perfluoroalkyl or a perfluoroalkoxy of 1 to 8 carbon atoms, and (iv) a perfluorovinyl ether of the formula $CF_2=CF-(OCF_2\ CF(R_f))_a OR'_f$ where $R_f$ is as described in (iii), $R'_f$ is a perfluoroaliphatic, preferably a perfluoroalkyl or a perfluoroalkoxy, of 1 to 8, preferably 1 to 3, carbon atoms, and a has a value of 0 to 3. In one embodiment, suitable thermoplastic quadpolymers comprise (i) 40 to 80 weight percent (alternatively 45 to 76 weight percent) tetrafluoroethylene, (ii) 10 to 30 weight percent (alternatively 12 to 25 weight percent) vinylidene fluoride, (iii) 5 to 40 weight percent (alternatively from 10 to 30 weight percent) of a comonomer of the formula $CF=CFR_f$, and (iv) 0.1 to 15 weight percent (alternatively 1 to 10 weight percent) of the perfluorovinyl ether of the formula $CF_2=CF-(OCF_2CF(R_f))_a OR'_f$.

In an alternative embodiment, the thermoplastic quadpolymer contains interpolymerized units derived from TFE, VDF, HFP and the perfluorovinyl ether wherein the value of "a" is 0, 1 or 2.

In an alternative embodiment, the thermoplastic quadpolymer contains interpolymerized units derived from TFE, VDF, HFP and the perfluorovinyl ether is of the formulas PPVE1 or PPVE2:

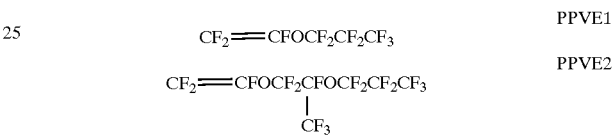

In one embodiment, the thermoplastic quadpolymer which may be used to form the barrier layer (3) of the hose of the present invention are commercially available from the Dyneon Company under the commercial designation THV X 815 G.

Disposed between the FKM layer and the barrier layer of thermoplastic quadpolymer is an adhesive amount (2) of a thermoplastic terpolymer derived from tetrafluoroethylene, hexafluoropropylene and vinylidene fluoride. By "adhesive amount", it is meant that the amount of thermoplastic terpolymer derived from tetrafluoroethylene, hexafluoropropylene and vinylidene fluoride disposed between the FKM layer and the barrier layer is sufficient to adhere the innermost layer to the barrier layer. Generally, an adhesive amount is an amount of the thermoplastic terpolymer disposed between the FKM layer and the barrier layer that does not significantly contribute to the fuel permeability resistance of the hose. More specifically, an adhesive amount of the thermoplastic terpolymer is, for example, a thin layer of the thermoplastic terpolymer that is too thin to function as a barrier layer but sufficient to act as an adhesive between the FKM layer and the thermoplastic quadpolymer barrier layer.

In one embodiment, an adhesive amount of the thermoplastic terpolymer derived from tetrafluoroethylene, hexafluoropropylene and vinylidene fluoride is diposed as a thin layer (2) with a thickness of between about 0.01 mm and about 0.1 mm. Alternatively, the thickness may be between about 0.02 mm and about 0.08 mm. The adhesive amount may be co-extruded with the thermoplastic quadpolymer barrier layer over the FKM innermost layer.

Suitable thermoplastic terpolymer of tetrafluoroethylene, hexafluoropropylene and vinylidene fluoride may include about 30–75 weight percent tetrafluoroethylene, about 5–40 weight percent hexafluoropropylene and about 5–55 weight percent vinylidene fluoride, with 100 weight percent of the monomer weight of the terpolymer made up from the combination of tetrafluoroethylene, hexafluoropropylene and vinylidene fluoride. Suitable thermoplastic terpolymers have a melting point range of about 75° C. to about 275° C. In one embodiment, suitable thermoplastic terpolymers of tetrafluoroethylene, vinylidene fluoride, and hexafluoropropylene are available from Dyneon LLC and Dyneon GmbH as THV-200, 300, 400, 500, and 600 series.

The last element required in the hose of the present invention is an outer cover (5). This outer cover (5) may be made from an elastomeric material or reinforcement. Examples of reinforcement include spiralled yarn, knitted yarn and braided yarn. Yarns of polyester, nylon, rayon and aramid may be used. When an elastomeric cover is desired, the cover (5) may be extruded over the underlying layer 3, or, as discussed below, various other optional layers. The elastomers which may be used to form the cover (5) for the hose (20) of the present invention include those known to those skilled in the art such as chlorosulfonated polyethylene, chlorinated polyethylene, acrylonitrile-butadiene rubber/PVC blends, epichlorohydrin, EPDM, chloroprene, EVA, ethylene acrylic elastomer AEM, and EVM. The thickness of the elastomeric cover (5) is obviously depends upon the desired properties of the hose (20) and the elastomer that is used. Generally speaking, the thickness of the elastomeric cover (5) will range from about 0.1 mm to about 10 mm, with a range of from 0.5 mm to being 2.5 mm being preferred.

Figure 2:
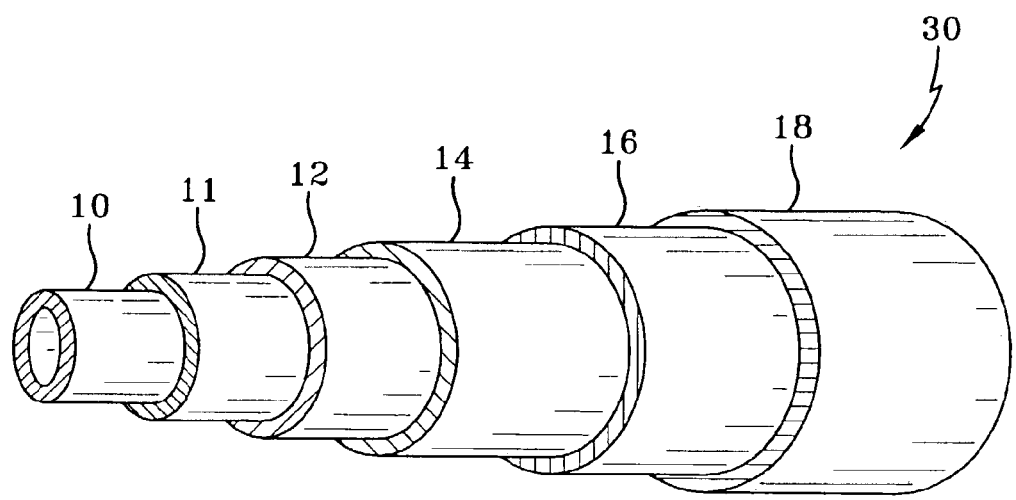
FIG. 2 is a perspective view of a hose according to the invention.

Whereas the basic layers have been discussed above as essential to the present invention, the hose of the present invention may have optional features. For example, when a hose (30), as shown in FIG. 2, is produced having the inner FKM core (10), adhesive layer (11) and barrier layer (12), dispersed on the outside of the barrier layer (12) maybe a first layer (14) of another polymer. Such polymer may be of the same composition as the inner core (10). In another embodiment, the polymer which is used in this first layer (14), which interfaces the barrier layer (12), may be epichlorohydrin. The thickness of this first layer (14) which interfaces the barrier layer (12) may range depending upon the polymer selected. Generally speaking, the thickness of this layer will range of from about 0.25 mm to about 1.5 mm with a range of from about 0.50 mm to about 1.0 mm being preferred.

Another optional feature of the present invention is reinforcement (16) which may be added on top of the first layer (14) which interfaces with the barrier layer (12). Such reinforcement (16) is known to those skilled in the art and may consist of spiraled, knitted or braided yarn. Such reinforcements are typically derived from polyester, nylon, rayon or aramid cords. The reinforcement (16) is preferably spirally wound about the first layer under sufficient tension to improve the strength of the hose structure. The reinforcement layer (16) is preferably spirally wrapped at angles such that the flexing of the hose (30) will not result in collapse or kinking. An angle such as from 0 to 89.9° with respect to the centerline of the hose may be used. Most preferably, a neutral angle of 54° 73' or below is used for the spiral wraps.

In accordance with one embodiment, the inner core (10) functions as a barrier layer comprised of the above-described terpolymer, the next layer (12) is made of the hydrogenated acrylonitrile-butadiene rubber, the next layer (14) is omitted, with reinforcement (16) being directly against the rubber layer (12) followed by an outer cover (18).

As mentioned above, the elastomeric cover (18) is the outside layer.

The FKM layer may be formed by extrusion methods known to those skilled in the art. The thickness of this layer whether the innermost layer 1 or next layer 3 is important as excessively thin wall thicknesses or excessively thick wall thicknesses present flexibility or kinking problems or coupling compatibility problems of the final hose composite. It is believed that the inside diameter of the innermost layer (1) whether made from the FKM or barrier layer should range from 3 mm to 100 mm. Preferably, the inside diameter of the innermost layer will range from 4 mm to 75 mm. When the innermost layer is made from the FKM, the wall thicknesses of the innermost layer (1) should range from 0.1 mm to 8 mm. Alternatively, the wall thickness of the innermost layer (1) will range from 0.5 mm to 4 mm. When the innermost layer is made from the barrier layer compound, the wall thicknesses of the innermost layer (1) should range from 0.1 to 1 mm.

The following example is provided to illustrate the instant invention and are not intended to limit the same.

EXAMPLE

A 1 inch inside diameter fuel hose was fabricated having the following construction according to FIG. 1:

innermost layer (1) of an FKM compound, having a wall thickness of about 25 mils (0.63 mm);

adhesive amount (2) of THV 500, having a thickness of about 2 mils;

barrier layer (3) of THV-815 having a thickness of about 8 mils; and elastomeric cover (5).

The hose was cured following standard techniques and tested for adhesion between the FKM/THV500/THV815 layers. The adhesion test showed stock tear of the FKM layer, indicating good adhesion between the FKM/THV500 layers and between the THV500/THV815 layers.

What is claimed is:

1. A hose comprising:

(1) a rubber layer comprising an FKM fluoroelastomer; and (2) a barrier layer comprised of a thermoplastic quadpolymer derived from (i) tetrafluoroethylene, (ii) vinylidene fluoride, (iii) at least one ethylenically unsaturated monomer of the formula $CF_2=CFR_f$ where $R_f$ is a perfluoroalkyl or a perfluoroalkoxy of 1 to 8 carbon atoms, and (iv) a perfluorovinyl ether of the formula $CF_2=CF-(OCF_2\ CF(R_f))_aOR'_f$, where $R_f$ is as described in (iii), $R'_f$ is a perfluoroaliphatic, preferably a perfluoroalkyl or a perfluoroalkoxy, of 1 to 8, preferably 1 to 3, carbon atoms, and "a" has a value of 0 to 3;

wherein the barrier layer is adhered to the rubber layer with an adhesive amount of a thermoplastic terpolymer of tetrafluoroethylene, hexafluoropropylene and vinylidene fluoride.

2. The hose of claim 1 wherein the thermoplastic quadpolymer contains interpolymerized units derived from tetrafluoroethylene, hexafluoropropylene and vinylidene fluoride, and a perfluorovinyl ether having an "a" value of 0, 1 or 2.

3. The hose of claim 1 wherein the thermoplastic quadpolymer contains interpolymerized units derived from tetrafluoroethylene, hexafluoropropylene, vinylidene fluoride and a perfluorovinyl ether of the formula PPVE1 or PPVE2:

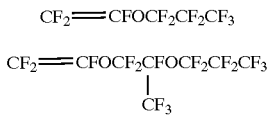

4. The hose of claim 1 wherein said thermoplastic quadpolymer comprises from about 40 to 80 weight percent tetrafluoroethylene; from about 10 to 30 weight percent vinylidene fluoride, from about 5 to 40 weight percent of a comonomer of the formula $CF_2=CFR_f$, and from about 0.1 to 15 weight percent of the perfluorovinyl ether of the formula $CF_2=CF-(OCF_2\ CF(R_f))_aOR'_f$.

5. The hose of claim 1, wherein said FKM fluoroelastomer comprises about 0 to 70 parts by weight tetrafluoroethylene, about 20 to 50 parts by weight hexafluoropropylene and about 20 to 80 parts by weight vinylidene fluoride, based on 100 parts by weight of FKM.

6. The hose of claim 1, wherein said thermoplastic terpolymer of tetrafluoroethylene, hexafluoropropylene and vinylidene fluoride comprises about 30–75 weight percent tetrafluoroethylene, about 5–40 weight percent hexafluoropropylene and about 5–55 weight percent vinylidene fluoride.

7. The hose of claim 1 wherein said hose further comprises an outer cover made of a material selected from the group consisting of (a) elastomeric materials and (b) reinforcement material.

8. The hose of claim 7 wherein said elastomer that comprises said outer cover is selected from the group consisting of chlorosulfonated polyethylene, chlorinated polyethylene, acrylonitrile-butadiene rubber/PVC blends, epichlorohydrin, EPDM, chloroprene, EVA, ethylene acrylic elastomer and EVM.

9. The hose of claim 7 wherein said reinforcement material is from textile yarns of polyester, nylon, rayon and aramid.

10. The hose of claim 1 wherein the rubber layer comprising FKM rubber is the innermost layer of the hose.

11. The hose of claim 1 wherein the barrier layer is the innermost layer of the hose.

12. The hose of claim 9 wherein the inside diameter of the innermost layer ranges from 3 to 100 mm.

13. The hose of claim 10 wherein the inside diameter of the innermost layer ranges from 3 to 100 mm.

14. The hose of claim 10 wherein the thickness of the innermost layer ranges of from about 0.1 to 8 mm.

15. The hose of claim 10 wherein the thickness of the innermost layer ranges form about 0.5 to 4 mm.

16. The hose of claim 1 wherein the thickness of the barrier layer ranges from about 0.1 to 1 mm.

17. The hose of claim 1 wherein the thickness of the barrier layer ranges from about 0.15 to 0.5 mm.

18. The hose of claim 7 wherein the thickness of the outer cover made of elastomeric materials ranges from about 0.1 to 10 mm.

19. The hose of claim 1 wherein the adhesive amount of terpolymer is disposed as a layer having a thickness of between about 0.01 and 0.1 mm.

20. The hose of claim 1 wherein the adhesive amount of terpolymer is disposed as a layer having a thickness of between about 0.02 and 0.08 mm.

* * * * *